May 29, 1956 J. D. CONFELD 2,748,193

DUPLEX SIGNALING SYSTEM

Filed June 24, 1952 6 Sheets-Sheet 1

INVENTOR
JAMES D. CONFELD
BY T. L. Bowes
ATTORNEY

May 29, 1956 J. D. CONFELD 2,748,193

DUPLEX SIGNALING SYSTEM

Filed June 24, 1952 6 Sheets-Sheet 2

INVENTOR
JAMES D. CONFELD
BY
T. L. Bowes
ATTORNEY

May 29, 1956 J. D. CONFELD 2,748,193

DUPLEX SIGNALING SYSTEM

Filed June 24, 1952 6 Sheets-Sheet 3

INVENTOR
JAMES D. CONFELD
BY T. L. Bowes
ATTORNEY

DUPLEX SIGNALING SYSTEM

INVENTOR
JAMES D. CONFELD
BY T. L. Bowes
ATTORNEY

May 29, 1956 J. D. CONFELD 2,748,193

DUPLEX SIGNALING SYSTEM

Filed June 24, 1952 6 Sheets-Sheet 5

INVENTOR
JAMES D. CONFELD
BY T. L. Bowes
ATTORNEY

May 29, 1956 J. D. CONFELD 2,748,193

DUPLEX SIGNALING SYSTEM

Filed June 24, 1952 6 Sheets-Sheet 6

INVENTOR
JAMES D. CONFELD
BY T. L. Bowes
ATTORNEY

2,748,193

DUPLEX SIGNALING SYSTEM

James D. Confeld, Rochester, N. Y., assignor, by mesne assignments, to General Dynamics Corporation, a corporation of Delaware Application June 24, 1952, Serial No. 295,278

12 Claims. (Cl. 179—16)

This invention relates to signaling systems and particularly to means for controlling distantly located switching arrangements in telecommunication systems.

The object of the invention is to provide a flexible and economic switching arrangement for mixed toll and local service between distantly located communities both provided with machine switching equipment.

The invention consists of improvements in two way trunking circuits by which subscribers in one community may expeditiously establish connections to different points in another community and wherein the two way trunk is arranged to provide mixed service with a minimum of apparatus and complications in circuit arrangement.

In a specific embodiment of the invention a two way trunk circuit is provided as a termination of a long line, that is, a line of such length that it becomes necessary to employ a simplex or composite circuit consisting of two conductors to provide a communication channel and a derived signaling path. Outgoing calls through this circuit directed to some distant point over the said simplexed or composited circuit may be established over alternative paths of access to the circuit and in accordance with the path chosen will signal the circuit arrangement at the distant end and automatically direct the call over a different corresponding incoming circuit. Again, and specifically, if the outgoing call is directed to the toll operator at the distant end, then the outgoing call by the nature of the call code will be directed over a toll access path to this two way trunk and a direct path to the toll board at the distant end, requiring no further dialing will be selected. On the other hand, if the call is intended for a local subscriber at the distant end then another access path to the two way trunk is chosen, by virtue of the call code, and the connection at the distant end is automatically directed to an incoming selector switch which may be controlled over the long line to extend the connection over a conventional switch train to a local substation. Since this two way trunk circuit is used where community centers are reasonably near together so that no extra charge is entailed in such a connection, this path of access to the trunk line is known as a free service terminal. Therefore, the circuit is provided with toll access and free service access outgoing terminals.

The trunk is also provided with a path to an incoming switch by which calls incoming from the distant end may be directed over a conventional switch train to a local substation. For traffic in this direction, means are provided in the trunk circuit arrangement to differentiate between different points of origin of the call. For instance, if the call came from a substation at the distant end of the trunk, then the local switch train over the said incoming switch would be affected in one manner, while if the call came from a toll board the local switch train would be affected in another manner. Specifically, ringing of the called subscriber is handled on a different basis in accordance with the point of origin of the call extended through this incoming switch. If the call came from a substation, then the local switch train connector will automatically apply ringing to the called subscriber's line, but if the call came from the toll board ringing will be withheld and placed under the control of the distant toll operator.

A feature of the invention is a combination differential duplex and polar duplex circuit by which a plurality of signals in either direction may be transmitted independently. By way of example, where the normal condition of the said differential duplex circuit involves a connection to a positive battery connection at each end, then the changing of such connection to a negative battery at either end will affect or control the differential duplex relay at the other end. Another relay in this signal circuit which is effectively polarized will not respond to this change. However, if the battery connection at one end instead of being changed from positive to negative is changed from positive to a high voltage positive, then both the differential duplex relay and the effectively polarized relay at the distant end will respond. Hence means are provided in a differential duplex circuit for independently and separately or simultaneously transmitting different signals to operate a plurality of distant relays in different combinations.

In accordance with this feature and by the use of such a combination of a differential duplex and polar circuit the distant end of a long line may be apprised of the origin of the call. Thus, in one direction if the call has come in over a free service access terminal the differential duplex relay will operate but the polar relay will not operate and the call will be automatically directed over an incoming switch and a local switch train. If, on the other hand, the call has come in over a toll access terminal both relays will respond and the call will be automatically extended over a direct path to the toll board. In the other direction, if the call has come in over a local switch train then the distant differential duplex relay alone will be operated and the local switch train will handle the call as a locally established connection. However, if the call has come in from the toll board, then both the distant differential duplex and polar relays will respond and the call will be handled by the local switch train as a toll call, that is, specifically the ringing of the called subscriber will be placed completely under the control of the toll operator.

This feature of the invention may therefore be stated as the combination of a long line comprising a communication channel and a derived signaling circuit thereover, a two way trunk circuit arrangement at each end thereof, means at each end for differently approaching the said terminal circuit, means for correspondingly transmitting different signals over said derived circuit and means in each said terminal circuit responsive to said different signals for correspondingly and differently switching an incoming connection.

Another feature of the invention is the use of a rectifier shunted relay in series with a differential duplex circuit to provide some of the aspects of polar duplex operation. A simple differential duplex circuit provides means for producing a two condition response at each distant end by a change of potential at each near end. By adding a simple rectifier shunted relay which is by far more economical than a polar relay, the distant differential duplex relay may be operated in the conventional manner and in addition both the distant differential duplex and the rectifier shunted relay may be operated by an increase of potential at the near end. Means are provided to shunt the latter relay on outgoing calls and also to shunt it on incoming calls after it has had an opportunity to respond to a discriminating condition established at the far end. This rectifier shunted relay is provided with a locking winding whereby if the first incoming circuit condition is one which will result in its operation as well as the operation of the differential duplex relay, it will operate and lock even though almost immediately the differential duplex relay will take it out of the circuit by short circuiting its winding.

Thus a feature of the invention may be stated as the combination of a differential duplex signal circuit including in its normal condition additional relay means not responsive to any of the ordinary differential duplex signals but responsive to a special high voltage signal to which the differential duplex circuit also responds, and means operative after the signal circuit has been taken for use for short circuiting said additional relay means. In other words a discriminating relay is placed in the derived circuit and given an opportunity to respond on the first operation of the derived circuit whereafter it is excluded from the circuit, first because it has no further function to perform and second to provide a lower resistance signal circuit for ensuing operations.

Another feature of the invention is the combination of a two way trunk circuit including a long line link consisting of a two wire communication channel and a derived signal circuit, consisting of a differential duplex arrangement, polar duplex relays and means at one end of said trunk responsive to the seizure thereof for excluding the said polar duplex relay thereat and means responsive to an operation of said differential duplex arrangement for excluding said polar duplex relay at the distant end of said trunk, said trunk circuit having a plurality of outgoing terminals at each end thereof and means selectively responsive to the seizure of said trunk over one or another of said outgoing terminals for transiently operating said polar duplex relay at the distant end thereof. In accordance with this feature, the use of a polar duplex arrangement in combination with this type of two way trunk circuit, the seizure thereof over a given one of the outgoing terminals may be signaled to produce a discriminating operation at the other end, whereby the trunk may be used as a link in several different kinds of connections.

Another feature of the invention is the combination of a two way trunk circuit including a long line link consisting of a two wire communication channel and a derived signal circuit having several sets of outgoing terminals at each end and a pulse correction circuit whereby dial pulses transmitted over the said derived signal circuit may be transmitted to distant switch trains in unmutilated form. The pulse correction circuit is designed to respond to trains of mutilated pulses and convert them to trains of standard timed pulses so that the said distant switch trains may be surely and properly operated. The use of a pulse correction circuit in a two way trunk circuit arrangement of this nature where diverse services are provided has numerous advantages for it affords dependable dial service between distant communities where for economic reasons the trunking is limited and only two wire circuits are used. Since in such localities subscribers in such separated communities are considered to be all in a local area, the dialing must be standard and dependable. Again, the two way trunk of the present invention is employed as a tandem link, where for obvious reasons a pulse correction means is not only desirable but often necessary.

Another feature of the invention is the use of a pulse correction circuit which will operate both from pulses coming in over a long line to a terminal circuit and the pulses outgoing from this circuit and to be transmitted over the long line. The pulse correction circuit is a timing means whereby the length of the pulses may be standardised even though they have become foreshortened in transmission up ot this point. Where the terminal circuit of the present invention is used in a small and distant office the pulses coming in to this circuit over the long line are corrected so that the local switch trains may be properly operated. On the other hand, where a local switch train is set up to this terminal circuit for the purpose of completing a connection over the long line by a distant switch train the pulse correction circuit is used to insure that the pulses outgoing over the long line will be properly timed.

A feature of the invention may then be stated as the use of a pulse correction circuit in a long line termination for retiming pulses transmitted over the long line to the terminal circuit and for retiming pulses to be transmitted from the terminal circuit over the long line.

Another feature of the invention resides in provisions for certain supervisory controls conventional in local switching circuits where the use of three or even four wire trunks between circuits is not a problem. By way of example, when a connection is established to a called substation the answer of the called party is signalled to the calling party in one manner if the call comes from a subscriber's station and in another manner if the call comes from a toll board. In one case there is a battery reversal in the communication channel itself and in the other case there is a battery reversal in a control conductor, known herein as the HS circuit. The two way trunk circuit of the present invention is arranged to operate for and to discriminate between toll and local service and must therefore differentiate in the transmission and relaying of the control or supervisory signals.

A feature of the invention may therefore be stated as the provision of means in a two way trunk circuit including a long line link comprising a two conductor communication channel and a derived signal circuit extending between terminal circuit arrangements each having a plurality of sets of different outgoing terminals and incoming terminals for discriminating between and adjusting accordingly the supervisory control circuits adapted for different types of service provided over said different outgoing and incoming terminals.

Other features will appear hereinafter.

The drawings consist of six sheets having seven figures, as follows.

Figure 3:
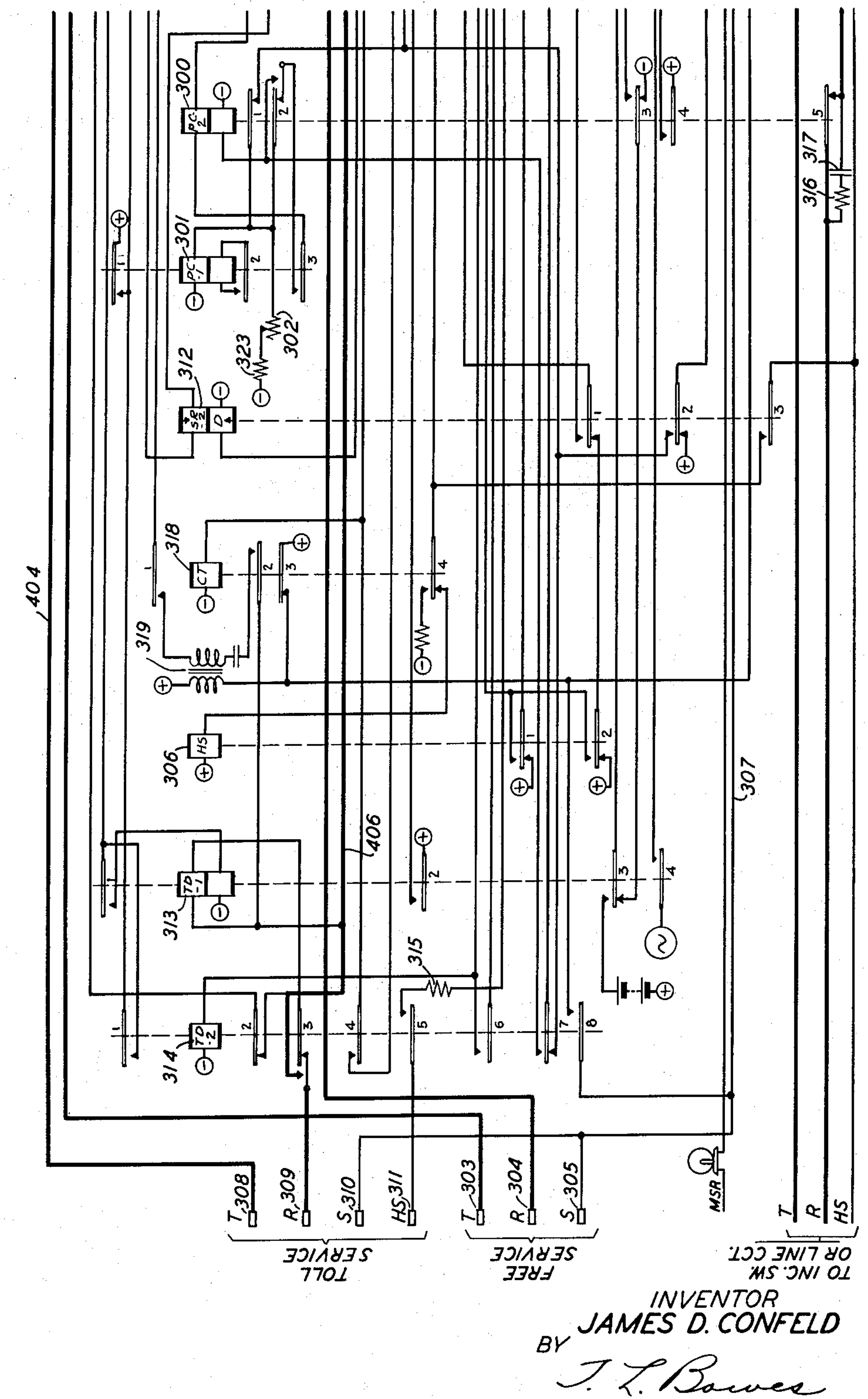
Figure 4:
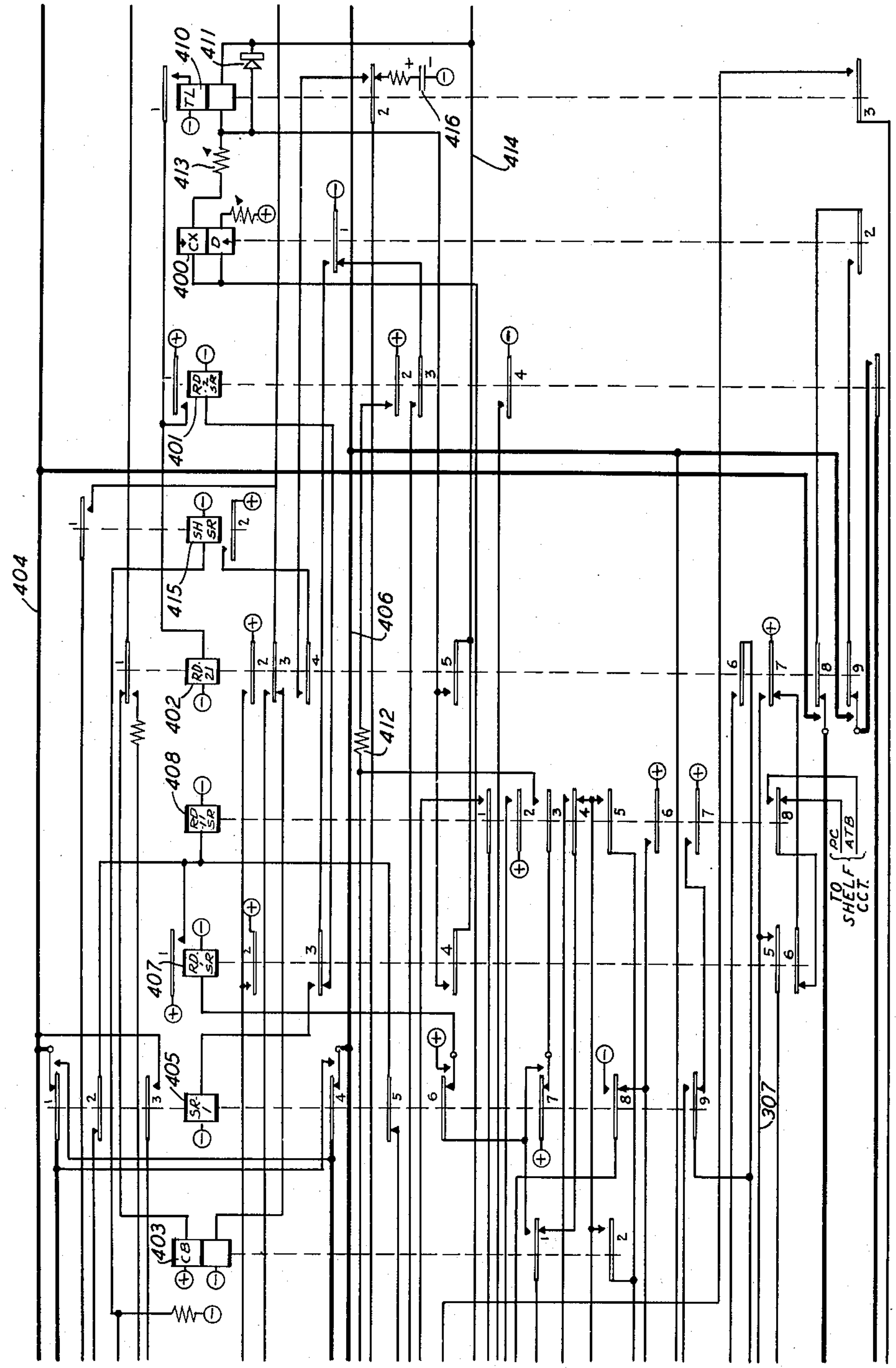
Figure 5:
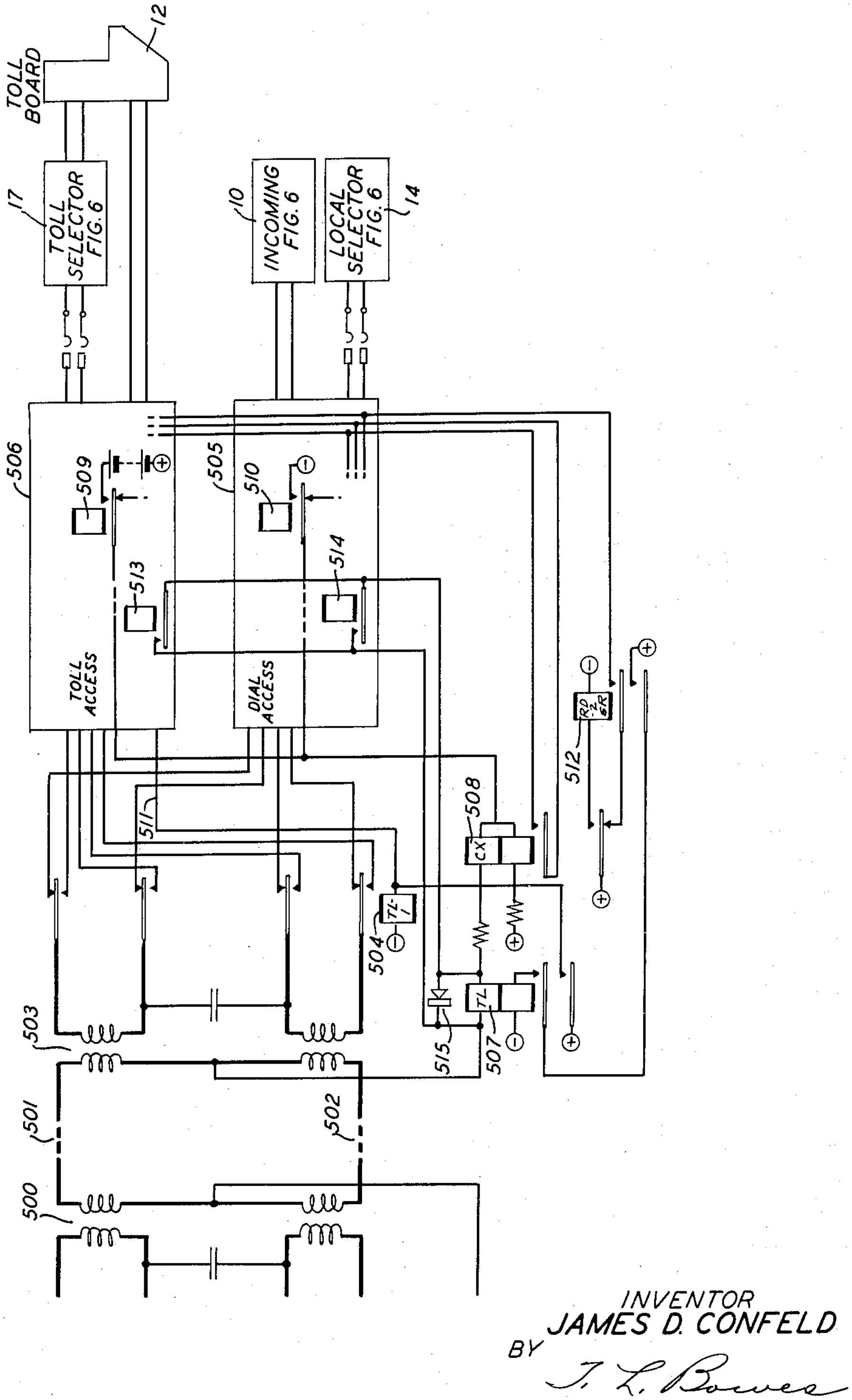
Figure 6:
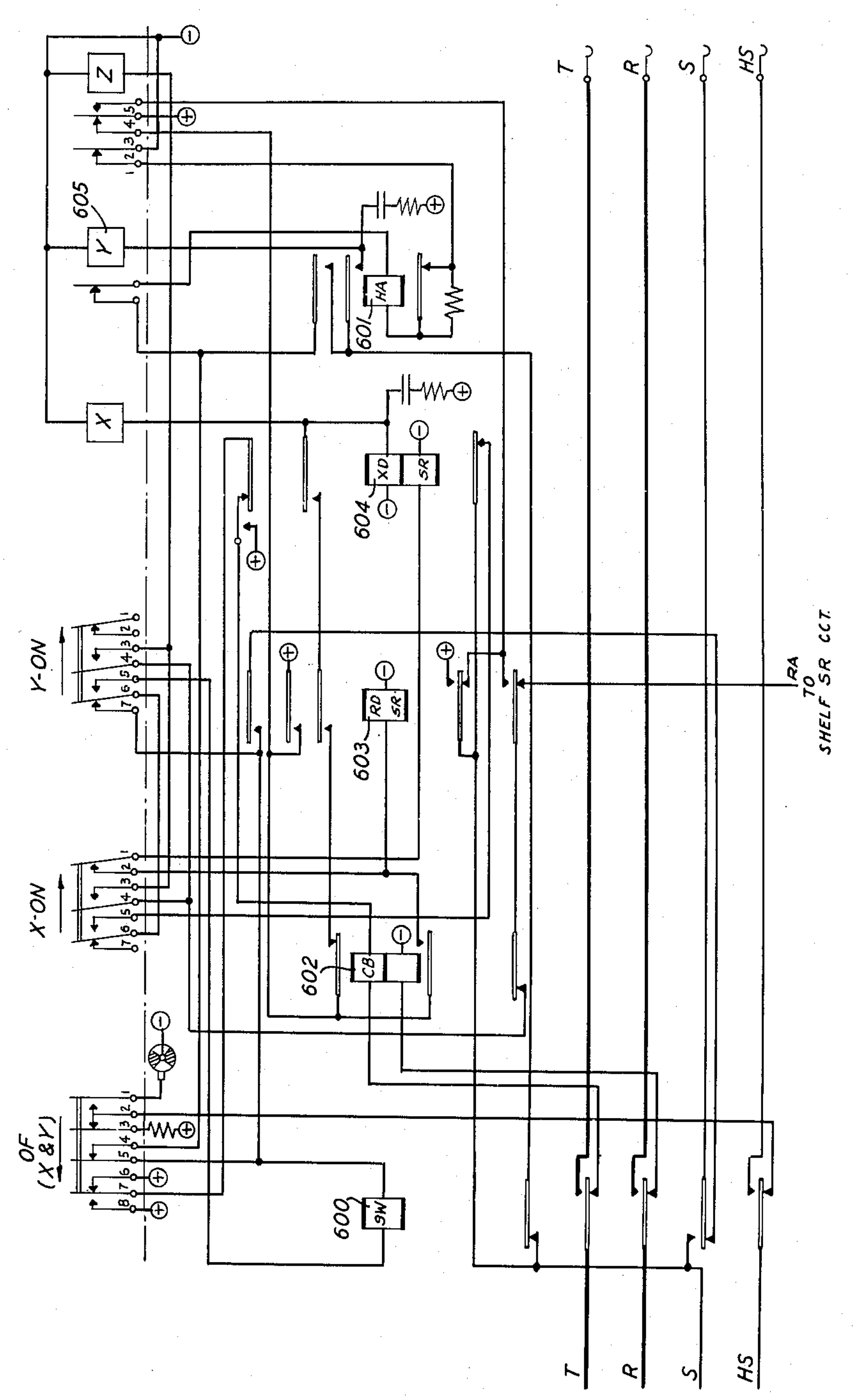
Figure 7:
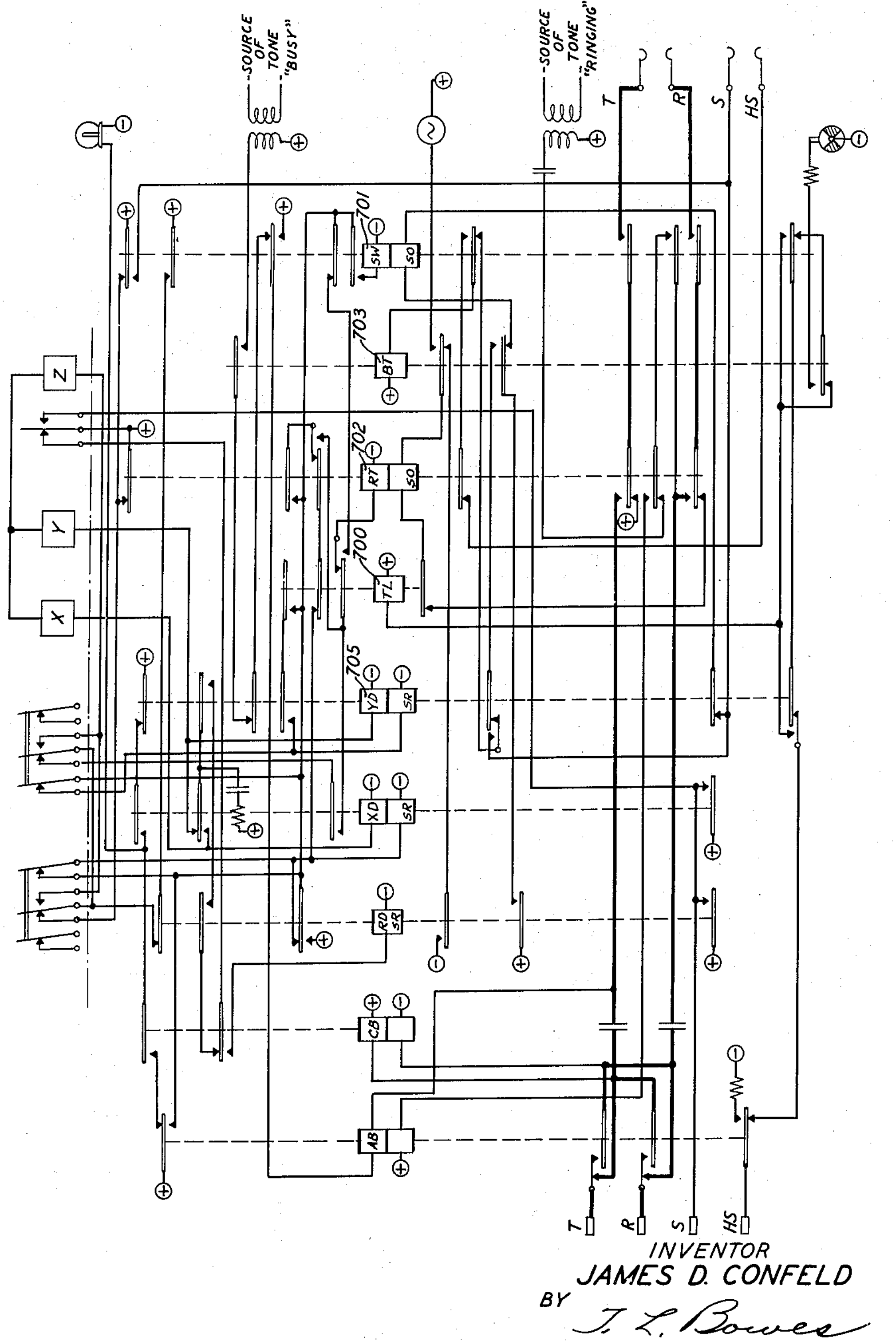

Figs. 3 and 4 taken together with Fig. 3 to the left of Fig. 4 provide a schematic circuit diagram of a terminal circuit of a two way trunk circuit located in a community distant from a toll center;

Fig. 5 is a schematic circuit diagram showing the simplexed toll line leading from the terminal circuit of Figs. 3 and 4 and the switching arrangement at the distant end or toll center whereby the line may be used either over the normally connected local access or the alternatively connected toll access, the switch between these two being made by a TL relay operated by the discriminating pulse sent out from the terminal circuit of Figs. 3 and 4;

Fig. 6 is a schematic circuit diagram showing a conventional selector suitable for use as a local, an incoming or a toll selector, and Fig. 7 is a conventional connector circuit having a particular type of HS supervisory control so that the connector will differentiate in its response between a local and a toll connection extended thereto.

Figure 1:
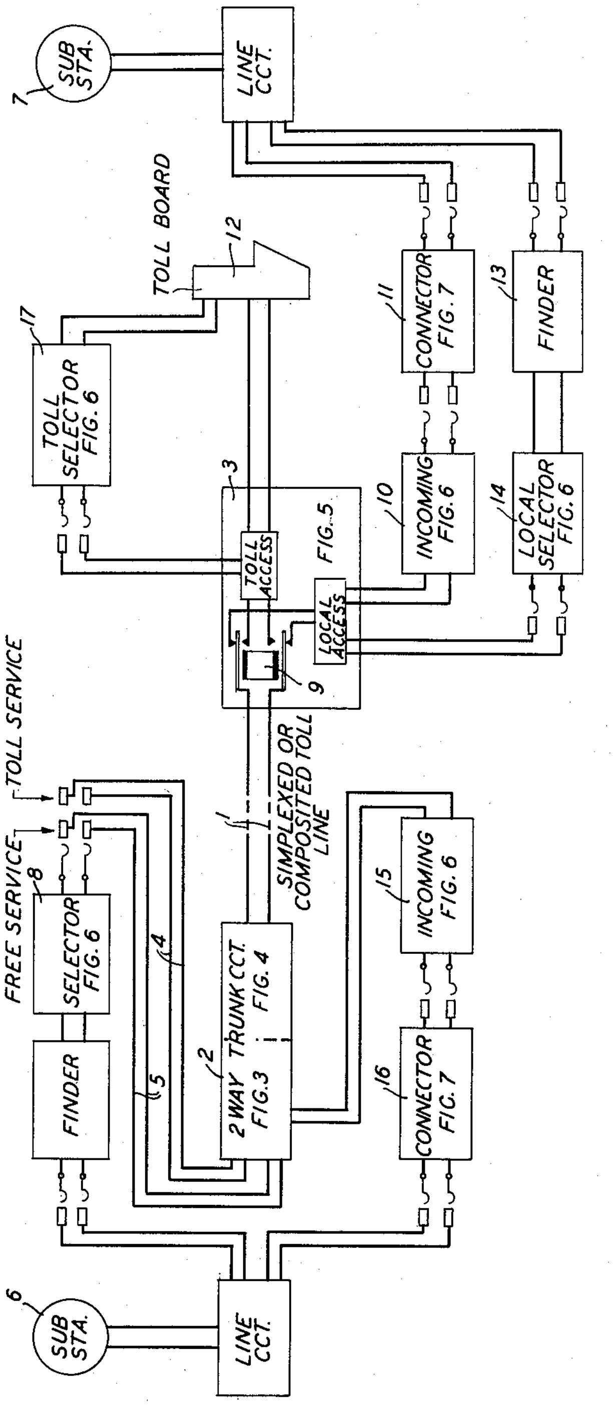
Fig. 1 is a combination block and schematic circuit diagram showing the general circuit arrangement and indicating by blocks the manner in which the detailed circuit diagrams are fitted into the complete arrangement.

The invention may be explained with the help of Fig. 1. Here there is shown a simplexed or composited long line 1 terminating in a two way trunk circuit termination 2, representing Figs. 3 and 4, at one end and a two way trunk circuit termination 3, representing Fig. 5 at the other end. The termination 2 may be seized either by way of a toll access termination 4 or a free service access termination 5. If a subscriber at the substation 6 wishes to dial a connection to another subscriber, say at substation 7 he will operate a local selector 8 to make a connection over the free service termination 5. Thereupon the connection will be extended over the long line 1 and through the back contacts of a relay 9 in the termination 3 to the incoming selector 10, thence through the connector 11 to the called station 7. If, on the other hand, the subscriber at substation 6 wishes to reach the toll operator, he will operate the local selector 8 (dial 0) to the toll access termination 4. Thereupon in the two way trunk circuit termination a characteristic discriminating signal will be transmitted over the long line to cause the operator of the relay 9 in the termination 3 so that the connection will be extended directly to the toll board 12 without further dialing.

The two way trunk circuit termination likewise discriminates between the paths over which it is seized. If the subscriber at substation 7 wishes to reach the subscriber at substation 6, then he will establish a conventional connection over the finder 13, the local selector 14, thence over the incoming selector 15 and the connector 16 to the called substation 6. In this case the connector will be notified by the trunk circuit termination 2 that this is a free service call and will operate accordingly, that is it will automatically apply ringing current to the called line. On the other hand, if the operator at the toll board 12 wishes to reach the subscriber at substation 6, she will operate the toll selector 17 and in the same manner will then reach the called line over the incoming selector 15 and the connector 16. In this case, however, the connector 16 will be notified by the two way trunk termination 2 that this is a toll call and hence ringing will be withheld so that it may be applied at the will of the toll operator.

Figure 2:
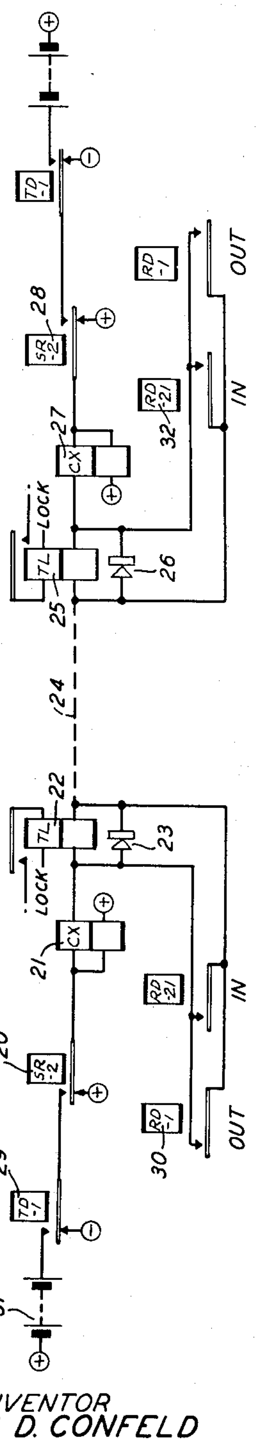
Fig. 2 is a schematic circuit diagram showing how a plurality of signals in each direction may be sent over a derived signal circuit.

Fig. 2 shows the principal elements of the fundamental or derived circuit incorporated in the long line 1 and the terminations 2 and 3. Normally a connection is established from ground at the back contact and armature of the SR–2 relay 20, the windings of the CX relay 21, through the lower winding to ground and through the upper winding to the signal circuit, thence in parallel through the lower winding of the TL relay 22 and the rectifier 23 over the derived signal circuit 24, in parallel through the lower winding of the TL relay 25 and the rectifier 26, the upper winding of the CX relay 27, the armature and back contact of the SR–2 relay 28 to ground. No relay is energized in this circuit.

If the termination 2 is seized over the toll access line 4, then the TD–1 relay 29 will be operated. Upon seizure the RD–1 relay 30 for outgoing service will be seized so that the lower winding of the TL relay 22 and the rectifier 23 will be shortcircuited. Thereupon the SR–2 relay will operate and hence the normal positive potential ground to the signal circuit will be boosted by the positive battery 31. The CX relay 21 will remain unaffected by this but at the other end of the signal circuit both the TL relay 25 and the CX relay 27 will respond. The TL relay 25 immediately locks in the locking circuit through its upper winding. Its lower winding is almost immediately shortcircuited by the RD–21 relay 32 which responds to the CX relay 27. The TL relay at the distant end thereby has an opportunity to operate and if it operates it locks. However, the fundamental derived circuit is connected to a simple differential duplex circuit by the shortcircuiting of the TL relay 22 by the RD–1 relay 30 on outgoing service and by the shortcircuiting of the TL relay 25 by the RD–21 relay 32 on incoming service.

It will be apparent that if the termination 2 is seized over a free service line 5, that the TD–1 relay will not be operated and hence the ground at the back contact of the SR–2 relay 20 is changed to battery at the back contact of the TD–1 relay 29. To this connection only the CX relay 27 at the distant end will respond since the direction of current flow through the lower winding of the TL relay 25 is reversed and to this reversed current the rectifier 26 presents a low resistance practically shortcircuiting the winding. The CX relay 27 responds and immediately causes the operation of the RD–21 relay 32 thus excluding the TL relay 25 from the circuit.

Similar operations are carried out in the reverse direction. It will thus be seen that in its normal condition the fundamental derived signal circuit consists of a differential duplex arrangement having an effectively polar relay included therein. The signal circuit on being seized, immediately excludes the near end polar relay but gives the distant polar relay an opportunity to operate. If it does operate, it locks and thereby remains in condition to perform its function. In either case it is almost immediately excluded from the circuit which is thereafter employed for dialing and supervision as will be more fully explained hereinafter.

*Two way trunk circuit termination distant from toll office*

Figs. 3 and 4 taken with Fig. 4 to the right of Fig. 3 constitute a schematic circuit diagram of the two way trunk circuit at an office distant from the toll center. This termination has a plurality of terminals (1) an outgoing terminal by which this circuit may be seized to establish a connection to the toll board, (2) a terminal by which this circuit may be seized to establish a connection to a called subscriber in the office at the location of the toll center, (3) a connection to an incoming switch and (4) the connections to a simplexed or composited long line. As explained in connection with Fig. 1, a subscriber at this office may establish a connection to the toll board by selecting the toll access terminals whereupon the connection will be immediately extended to the toll board without further action on the part of the calling subscriber. Likewise the subscriber may establish a connection by dialing to what are known as the free service terminals of this trunk, whereupon a connection will be extended to an incoming switch at the distant point which may then be set in a conventional manner. In case the call comes in the other direction, that is from the distant point, it will be extended to the incoming switch which may then be dialed into connection with any given wanted subscriber. If this call comes from a subscriber's station at the distant point, then the incoming switch and the connector will be operated in a conventional manner and the called subscriber will be automatically rung. If, on the other hand, the connection to this incoming switch comes from a toll board, then the connector will be controlled in such a manner that ringing is withheld and then applied at the will of the operator.

*Seizure over free service terminals*

The free service terminals for this circuit comprises the tip terminal 303, the ring terminal 304 and the sleeve terminal 305. Seizure of this circuit consists in bridging the terminals 303 and 304 whereupon a circuit is extended from ground, the upper winding of the CB relay 403, the back contact and armature 1 of the RD–21 relay 402, the upper left winding of the repeating coil 500, the tip conductor 404, the back contact and armature 1 of the SR–1 relay 405, the tip terminal 303 thence over the bridge established for seizure of this circuit, the ring terminal 304, the armature 4 and back contact of the SR–1 relay 405, the ring conductor 406, the lower left winding of the repeating coil 500, armature 3 and back contact of the RD–21 relay 402, the lower winding of the CB calling bridge relay 403 to battery. The calling bridge relay responds and causes the operation of its slow releasing relays the RD–1 relay 407 and the RD–11 relay 408. The circuit for the RD–1 relay may be traced from ground, back contact and armature 1 of the HS relay 306, armature 1 and front contact of the CB relay 403, armature 6 and back contact of the SR–1 relay 405, the winding of the RD–1 relay 407 to battery. This latter relay in operating extends a connection from ground, its armature 1 and front contact through the winding of the RD–11 relay 408 to battery. This relay immediately grounds the sleeve conductor leading to the outgoing terminals from ground, armature 7 and front contact of the RD–21 relay 402 to the sleeve conductor 307 thus returning ground not only over the sleeve terminal 305 but placing ground also on the sleeve terminal 310 of the toll access terminals.

As one result of the seizure of this trunk the operation of the calling bridge relay 403 and the two slow releasing relays 407 and 408, the RD–1 relay 407 by its armature 4 and front contact bridges the lower winding of the TL relay 410 and the rectifier 411 in parallel therewith. A circuit is now established from ground, armature 7 and back contact of the SR–1 relay 405, armature 3 and front contact of the RD–11 relay 408, the lower winding of the differential relay 312 to battery. It may be noted at this point that the SR–2 relay 312 is differential in this respect. When it is energized through its lower winding in the manner just described it will operate. However, at a later point a circuit for its lower winding will be established from ground, armature 2 and front contact of the RD–2 relay 401 through the resistance 412 and thence over the circuit described which, due to this resistance, will prevent it from being operated. The upper winding of this relay will at some later time be energized from the calling bridge relay of the incoming selector and later from the calling bridge relay of the connector but the direction of current flow will oppose the energization of its lower winding and therefore the relay will not operate. However, when the called subscriber answers the direction of current flow in the upper winding of the SR–2 relay 312 will be reversed and this relay will operate at that time.

The SR–2 relay 312 operating at this time establishes a connection from battery, armature 3 and back contact of the PC–2 relay 300, back contact and armature 3 of the TD–1 relay 313, armature 2 and front contact of the CB relay 403, front contact and armature 1 of the SR–2 relay 312, the windings of the CX relay 400, through the lower winding thereof to a ground connection and through the upper winding thereof to the adjustable resistance 413, through the front contact and armature 4 of the RD–1 relay 407 thence over the signal conductor 414 leading to the two way trunk circuit at the distant end of the long line. The CX relay 400 does not operate in this circuit, but the distant CX relay will respond as will be more fully explained hereinafter.

*Seizure of the two way trunk circuit over the toll access terminals*

In case the calling subscriber local to the circuit shown in Figs. 3 and 4 wishes to establish connection to the toll operator he will dial a number (generally zero) which will establish connection to the tip terminal 308, the ring terminal 309, the sleeve terminal 310 and the HS terminal 311 in this circuit. As before, a bridge is placed across the tip and ring terminals whereupon a circuit may be traced from ground, the upper winding of the CB relay 403, back contact and armature 1 of the RD–21 relay 402, the upper left hand winding of the repeating coil 500, the tip conductor 404, the tip terminal 308, over the established bridge, the ring terminal 309, the back contact and armature 3 of the TD–2 relay 314, the upper winding of the TD–1 relay 313, the ring conductor 406, the lower left winding of the repeating coil 500, armature 3 and back contact of the RD–21 relay 402, the lower winding of the CB relay 403 to battery. This causes the operation of the TD–1 relay 313 as well as the operation of the CB relay 403. The CB relay, as before, causes the operation of its two slow releasing relays, the RD–1 relay 407 and the RD–11 relay 408. Upon the operation of the TD–1 relay 313 this relay will lock from battery through its lower winding, its front contact and armature 1, the back contact and armature 2 of the SR–1 relay 405, the front contact and armature 1 of the RD–1 relay 407 to ground. At the same time the TD–1 relay 313 will establish a circuit from ground, armature 2 and front contact of the TD–1 relay 313, the front contact and armature 1 of the RD–11 relay 408, the winding of the TD–2 relay 314 to battery. The TD–2 relay operates and locks through its front contact and armature 6 to ground supplied over the front contact and armature 2 of the DR–11 relay 408. The TD–2 relay in operating short circuits the upper winding of the TD–1 relay 313 and connects the ring terminal 309 directly to the ring conductor 406.

The sleeve terminal 310 is grounded, as before, and the lower winding of the TL relay 410 and the rectifier 411 are short circuited as before. At this time the signal to be sent over the derived circuit 414 instead of being extended from the back contact and armature 3 of the PC–2 relay 300 is extended from the high voltage positive battery connected to the front contact and armature 3 of the TD–1 relay 313 so that the signal transmitted to the distant point will be a high voltage positive signal instead of a negative signal. This will result in the operation of both the CX and the TL relays at the distant point as will be more fully described hereinafter.

*Dialing distant incoming selector*

It has been noted hereinbefore that when a connection is established over the free service terminals, a connection will be established to the incoming selector at the distant point. When, however, the circuit is seized over the toll access terminals a circuit is established directly to the toll board at the distant point and no further dialing is necessary. In the first instance then dialing will take place through the operation of the CB relay in the conventional manner. This relay will operate the pulse correction relays 300 and 301 and armature 3 of the PC–2 relay becomes the dialing contact. Dial pulses are in the form of a series of releasing movements of the CB relay 402, each such back movement of its armature constituting a dial pulse. On each such movement a circuit is established from ground, back contact and armature 1 of the HS relay 306, armature 1 and back contact of the CB relay 403, armature 4 and front contact of the RD–11 relay 408, armature 7 and back contact of the TD–2 relay 314, back contact and armature 1 of the PC–2 relay 300 and thence through the upper winding of the PC–1 relay 301 to battery. The PC–1 relay is fast to operate and responds in this circuit immediately and remains operated as long as the CB relay 403 maintains the connection through its armature 1 and back contact. PC–1 relay 301 prepares a circuit for the PC–2 relay 300 by connecting the upper winding thereof in a circuit from ground, armature 2 and front contact of the RD–1 relay 407, upper winding of the PC–2 relay 300, armature 3 and front contact of the PC–1 relay 301, back contact and armature 2 of the PC–2 relay 300, armature 1 and back contact of the PC–2 relay 300 back to the ground which was used for the energization of the PC–1 relay 301. Thus the upper winding of the PC–2 relay 300 is short-circuited at this time and this condition is maintained until the CB relay 403 again becomes energized. When this happens the left terminal of the upper winding of the PC–2 relay 300 is freed of ground but left connected to battery including the upper winding of the PC–1 relay 301 and in parallel therewith a circuit including the adjustable resistance 302 and the fixed resistance 303 to battery. The PC–2 relay 300 now responds. During its energizing movement the ground from the upper winding of the PC–2 relay 300, by virtue of the continuity contacts of its armature 2, insures the continued energization of the PC–1 relay 301 until the PC–2 relay 300 is completely energized and held in this condition by a circuit through the two windings thereof in series and including armature 3 and front contact of the PC–1 relay 301.

Now the PC–1 relay 301 is rendered somewhat slow to release first by the connection of its upper winding through the resistances 302 and 303 to battery and second by the short circuiting of the lower winding thereof by its own armature 2 and front contact, so that the energizing circuit for the PC–2 relay 300 is not immediately broken. When the PC–1 relay 301 does release, however, the PC–2 relay 300 follows immediately and releases thus reestablishing the original condition awaiting the next pulse consisting of the next release of the CB relay 403. The timing of the PC–2 relay 300 depends on the slow releasing characteristics of the PC–1 relay 301 and this may be adjusted by changing the adjustable resistance 302 so that even if the periods of release of the CB relay 403 are unduly short due to adverse line conditions the periods of operation of the PC–2 relay 300 may be adjusted to a standard value. Armature 3 and back contact of the PC–2 relay 300 constitute dialing contacts for operating the distant incoming switch. During the periods of non-operation by the PC–2 relay 300 a battery connection is extended from battery, the back contact and armature 3 of the PC–2 relay 300, the back contact and armature 3 of the TD–1 relay 313, the armature 5 and front contact of the RD–11 relay 408, the front contact and armature 1 of the SR–2 relay 312 to the winding of the CX relay 400 and thence over the derived circuit 414 to the distant point. Each operation of the PC–2 relay 300 constitutes a dial pulse and at this time the battery at the back contact and armature 3 of the PC–2 relay 300 is changed to a ground connection from the armature 6 and front contact of the RD–11 relay 408 whereby the distant CX relay is released.

*The called subscriber answers*

It will be shortly noted at this point that when the called subscriber at the distance point answers, the CX relay 400 will be caused to operate. This will be immediately followed by the operation of the SR–1 relay 405 so that the connections to the CB relay 403 will be reversed thus following conventional practice.

In the event that the connection had been extended to the toll operator the operation of the SR–1 relay 405 will also change the connection of its armature 8 from a ground at the armature 6 of the RD–11 relay 408 to a battery at its own front contact, which battery connection is extended through the resistance 315, the front contact and armature 5 of the TD–2 relay 314 to the HS contact 311, for conventional purposes.

It may be noted that when the connection has been extended to the termination circuit of Figs. 3 and 4 over the toll access terminals 308 to 311 inclusive that the CT relay 318 is operated in a circuit including armature 4 and front contact of the TD–2 relay 314, the back contact and armature 5 of the SR–1 relay 405, the front contact and armature 1 of the RD–1 relay 407 to ground. This would tend to connect the secondary winding of the tone coil 319 to the talking conductors of the connection, but such a connection is held open at the armature 3 and front contact of the SR–1 relay 405. When the called subscriber, in this case the toll operator, answers then the SR–1 relay 405 is operated by the response of the CX relay 400 to the connection at the distant end established by the answer of the toll operator. It may be noted that during the establishment of the connection for the operation of the CT relay 318 that a circuit was completed from battery, the condenser 416, the back contact and armature 2 of the TL relay 410 to the ground used for the operation of the CT relay 318. Upon the operation of the SR–1 relay 405 this ground connection is opened at the armature 5 and back contact of the SR–1 relay 405 whereby the CT relay 318 would ordinarily become deenergized. However, the condenser 416 is charged at this time and therefore discharges through the winding of the CT relay 318 and maintains this relay operated for a short period (750 milliseconds). During this period a coin tone will be connected from the line circuit of the calling line providing this is a coin box line to the sleeve of the connection and hence the tone will be transmitted over armature 8 and front contact of the TD–2 relay 314, the primary of the tone coil 319 to ground so that the temporary connection of the secondary of this coil to the talking conductors delivers a spurt of tone to the communication channel which will be heard both by the calling subscriber and by the operator who has just answered so that she will be able to supervise properly the connection.

*Incoming call*

In a manner similar to that hereinbefore described, an incoming call will consist of the operation of the CX relay 400 if the call comes from a free service outgoing terminal at the distant end and the operation of both the CX relay 400 and the TL relay 410 if the call comes from the toll operator. In the latter case the TL relay 410 will operate through its lower winding and lock through its upper winding, its front contact and armature 1 to a ground which is immediately supplied by the front contact and armature 1 of the RD–2 relay 401. The operation of the CX relay 400 extends a ground from its armature 1 and front contact, the armature 3 and back contact of the RD–1 relay 407, the winding of the RD–2 relay 401 to battery, thus operating this slow release relay, providing a circuit for the operation of the RD–21 slow release relay 402 and a locking circuit for the TL relay 410. Upon the operation of the RD–21 relay 402 the lower winding of the TL relay 410 and the rectifier 411 are shortcircuited. It thus appears that the TL relay 410 has an opportunity to operate during the movement of the armature of the CX relay 400 and the following movement of the armature of the RD–2 relay 401. If the TL relay 410 operates at this time it remains operated thereafter under control of the RD–2 relay 401.

Upon the operation of the RD–2 relay 401 the tip and ring conductors to the incoming switch are bridged in a circuit from the back contact and armature 8 of the RD–21 relay 402, the armature 2 and front contact of the CX relay 400, the armature 9 and back contact of the RD–21 relay 402, the front contact and armature 5 of the RD–2 relay 401, the back contact and armature 5 of the PC–2 relay 300. This circuit is for the instant seizure of the incoming switch but is changed almost immediately by the operation of the RD–21 relay 402. Thereupon the circuit from the tip of the incoming switch is traced through the front contacts of armature 8 of the RD–21 relay, the upper left winding of the repeating coil 500, armature 1 and front contact of the RD–21 relay 402, the upper winding of the SR–2 relay 312, the front contact and armature 3 of the RD–21 relay 402, the lower left winding of the repeating coil 500, the front contacts of armature 9 of the RD–21 relay 402, the front contact and armature 5 of the RD–2 relay 401, the back contact and armature 5 of the PC–2 relay 300 to the ring conductor leading into the incoming switch. It was explained hereinbefore that upon the operation of the RD–2 relay 401 the lower winding of the SR–2 relay 313 would be energized through the resistance 412. This and the energization of the upper winding thereof in the circuit just traced do not result in the energization of this SR–2 relay since the two windings are in opposed relation to each other.

After the incoming switch has been seized it may be dialed by a series of pulses transmitted over the derived circuit each of which is in the form of a releasing movement of the CX relay 400. Upon the first such releasing movement a circuit is established from ground, armature 1 and back contact of the CX relay 400, armature 3 and front contact of the RD–2 relay 401, the back contact and armature 1 of the PC–2 relay 300, to operate the PC–1 relay 301. The following operations of the pulse correction relays 300 and 301 are exactly the same as hereinbefore described. This time, however, the armature 5 and back contact of the PC–2 relay 300 constitute the dialing contacts for repeating the dial pulses into the incoming selector. These dialing contacts are protected by the resistance 316 and condenser 317 network bridged thereacross. In this manner the incoming switch and later the connector may be dialed into connection with any given called substation.

If this call has come from a subscriber's station so that the TL relay 410 is not operated then the HS conductor is not affected in any manner until the called subscriber answers and at that time a battery connection is returned thereover thence through armature 3 and front contact of the SR–2 relay 312 to cause the operation of the HS relay 306 which will result in transmitting a signal over the derived path to notify the calling subscriber that the called subscriber has answered. This will consist of a connection from battery, armature 4 and front contact of the RD–2 relay 401, front contact and armature 1 of the HS relay 306, armature 1 and back contact of the CB relay 403, armature 4 and back contact of the RD–11 relay 408, front contact and armature 1 of the SR–2 relay 312, the windings of the CX relay 400 and thence over the derived circuit hereinbefore traced to the conductor 414. This will operate the distant CX relay and constitute a supervisory signal.

If the call through this incoming switch had been established from the toll board then the TL relay 410 would have operated and this would immediately have connected the HS conductor from the incoming switch through armature 3 and front contact of the TL relay 410, the armature 4 and back contact of the CT relay 318, the winding of the HS relay 306 to ground. However, the connection which is found in the incoming switch is also a ground so that the HS relay is not operated at this time. During the dialing periods and due to the operation of the PC–1 relay 301, a connection is extended from ground, armature 1 and front contact of the PC–1 relay 301, the winding of the SH slow releasing relay 415 to battery. The SH relay operates and extends a ground from its armature 2 and front contact over the armature 4 and front contact of the RD–21 relay 402, the front contact and armature 2 of the TL relay 410, the winding of the CT relay 318 to battery. The CT relay changes the connection on the HS conductor from ground at its armature 4 and back contact to battery at its armature 4 and front contact. This plays no part during the dialing of the selector but, as will be more fully explained hereinafter, it affects the connector in such a way as to operate the TL relay therein for the purpose of withholding ringing and placing this function under the control of the toll operator.

Thereafter when the operator is ready to call in the called subscriber she will operate her ringing key which by conventional means will transmit to the circuit of Figs. 3 and 4 a single impulse of short duration to operate the PC relays in the same manner as they would be operated by a dial pulse. This again causes the momentary operation of the CT relay 318 and consequently the application of battery to the HS conductor again to operate momentarily the TL relay in the connector to apply ringing to the called subscriber.

The distant long line termination is shown in practically skeleton form in Fig. 5. The near end termination shown in Figs. 3 and 4 has the usual connections to a repeating coil 500 through which the long line consisting of the two conductors 501 and 502 provide both a communication channel and a derived signal path. At the distant end a repeating coil 503 is provided and the connections to this coil are led to the armatures of the TL–1 relay 504. In the normal position of this relay the repeating coil connections are extended into the dial access circuit 505 with all the details of which we are not concerned. It is sufficient to know that both outgoing connections over the long line and incoming connections therefrom may be set up through this circuit by outgoing switch trains represented by the local selector 14, Fig. 6, and by an incoming selector 10, Fig. 6. In its operated position the TL–1 relay 504 switches the repeating coil leads to a toll access circuit 506. This circuit provides a direct communication channel to the toll board 12 on incoming calls over the long line and an outgoing path over the long line by way of the toll selector 17.

A signal circuit provided by the TL relay 507 and the CX relay 508 similar to that in Figs. 3 and 4 is provided. When the toll access circuit 506 is seized from the toll board a positive high voltage is connected to this circuit by a relay 509 therein in order to operate the distant TL relay 410, and CX relay 400. When the dial access circuit 505 is seized on an outgoing call then negative battery is connected to the signal circuit by a relay 510 therein.

On an outgoing call from the toll access circuit 506 the lead 511 is grounded and the TL–1 relay 504 is operated. On an incoming call over the long line which has been extended from a toll access the TL relay 507 would be operated and locked and would likewise cause the operation of the TL–1 relay 504.

On either type of incoming call the CX relay 508 is operated and at certain times on either type of outgoing call this relay will respond to supervisory signals. Its armature 1 and front contact act as pulsing contacts on calls extending through the incoming switch 10 and control supervisory circuits at other times. Leads from these contacts as well as from the RD–2 slow releasing relay 512 are shown as extending into both the dial access circuit 505 and the toll access circuit 506. A relay 513 in the toll access circuit 506 represents the RD–1 and RD–21 relays therein and a relay 514 in the dial access circuit 505 represents the RD–1 and RD–21 relays therein to shortcircuit the winding of the TL relay 507 and the rectifier 515 in parallel therewith.

It is believed that the operation of the circuit of Fig. 5 will be clear without further detailed description particularly in view of the description of the similar circuits of Figs. 3 and 4.

*The selector*

The selector of Fig. 6 is conventional and is shown here in some detail merely to illustrate a suitable device which may be used as a local selector such as the selectors 8 and 14, as an incoming selector such as the selectors 15 and 10 and as a toll selector 17. The principal function of this device is to select a wanted connection and then to extend a clear metallic circuit therethrough consisting of the four paths, the tip, the ring, the sleeve and the HS supervisory path. Only one of these, the sleeve, has any connection to the circuit of the selector and this consists of a series circuit through the comparatively high resistance of the SW relay 600 and the comparatively low resistance of the HA relay 601 whereby the SW cut through relay 600 is maintained energized from a ground on the sleeve supplied by the connector or other circuit beyond. When this ground is removed then the SW relay releases and the selector is restored to normal.

Briefly, the selector has a CB calling bridge relay 602 which responds to seizure of the selector and then repeats the train of pulses transmitted thereto for the purpose of moving the brushes in their X or primary selecting movement. There are the usual two slow releasing relays, the RD relay 603 which remains energized through the energization of the calling bridge relay and the XD relay 604 which operates and holds steadily operated during the receipt of the train of impulses for setting the selector in its X direction. Thereafter the HA relay 601 and the Y magnet 605 interact with the SW relay shortcircuited by the grounds on the sleeves of busy lines until a free line is encountered when the SW relay is placed in series with the HA relay and cuts through the four leads of the selector. The comparatively high resistance of the SW relay prevents further operation of the HA relay and thus stops the operation of the Y magnet. Release, as stated, takes place when the sleeve is freed of ground.

*The connector*

The connector shown in Fig. 7 is also conventional but is shown here in some detail to explain the effect of the operation of the TL relay 410 of Fig. 4. This device and circuit functions as the connector 16, and connector 11 of Fig. 1.

The noteworthy feature of this connector is the TL relay 700. When the terminal circuit of Figs. 3 and 4 is employed in a connection from the distant toll access circuit and the TL relay 410 has been operated, then the HS lead is active and hence during dialing this lead is connected to battery so that the TL relay 700 operates and remains operated for a short period after the brushes of the connector have reached the called line.

If the called line is idle then the SW relay 701 operates, grounds the sleeve of the called line and closes a locking circuit for itself which will be maintained until both parties to the connection hang up. The SW relay 701 opens the normal holding path for the RT ringing trip relay 702, connects the BT relay 703 to the HS brush of the connector and connects the TL relay 700 to the incoming HS lead so that it may later respond to the ringing signal. Thus the operator has seized the line and marked it as busy and may withhold ringing until she wishes to summon the called party.

The TL relay 700 is operated during the dialing of the last digit and remains operated until after the YD relay 705 has released. During this time the RT relay 702 is operated. If the called line is idle then the SW relay 701 operates and opens the holding circuit of the RT relay 702 but before this can become effective the TL relay 700, through the operation of the SW relay 701, releases and completes a holding circuit for the RT relay 702. Thus if the TL relay is operated when the called line is tested for its busy or idle condition, the ringing trip relay is locked up and the application of ringing current to the called line is prevented.

Should a party on the line attempt to place a call while the toll operator is holding the line the AB relay 704 will operate to give the toll operator supervision by transferring the HS lead to battery.

When the operator wishes to ring, battery is forwarded on the HS lead as hereinbefore described and now causes the operation of the TL relay 700. The operation of this relay now opens the holding circuit of the RT relay 702 so that this relay restores and prepares a circuit for ringing which becomes effective when the TL relay 700 restores as the HS lead is again grounded. Thereupon the BT relay 703 is operated from ground on the HS lead to the called line circuit and generator or ringing current is applied to the called line through the lower winding of the RT relay 702. Thus the TL relay 700 controls the ringing and will unlock the RT relay 702 at any time after the SW relay 701 has become operated either to ring the called party for the original call or later on for a recall. Other operations of the connector of Fig. 7 are conventional. When the called subscriber answers the AB relay 704 responds and by reversing the line current causes the operation of the SR–2 relay hereinbefore described.

What is claimed is:

1. The combination of a two wire communication channel and a derived signal circuit therefor, a two way trunk circuit terminal arrangement for each end of said communication channel, each said terminal circuit having a plurality of sets of outgoing terminals, means responsive to the seizure of said terminal circuit over one or another of said sets of outgoing terminals for transmitting a corresponding one or another signal over said derived signal circuit, means at the distant end of said channel responsive differently to said one or another signal transmitted over said signal circuit, a plurality of incoming circuits connected to one of said terminal arrangements, said derived signal circuit comprising a combination differential and polar duplex circuit and including at each end thereof a differential relay and a polar relay, means at each end thereof for reversing the polarity of the battery potential connected thereto for operating the distant differential relay and means at each end thereof for increasing the battery potential connected thereto for operating both the distant differential and polar relays.

2. The combination of a two wire communication channel and a derived signal circuit therefor, a two way trunk circuit terminal arrangement for each end of said communication channel, each said terminal circuit having a plurality of outgoing terminals, means responsive to the seizure of said terminal circuit over one or another of said outgoing circuits for transmitting a corresponding one or another signal over said derived signal circuit, means at the distant end of said channel responsive differently to said one or another signal transmitted over said signal circuit, a plurality of incoming circuits connected to one of said terminal arrangements, said derived signal circuit comprising a differential duplex circuit having in series therewith at each end thereof a differential relay and an additional relay winding, a rectifier shunted about each said additional relay winding, means at each end thereof for reversing the polarity of the battery potential connected thereto for operating the distant differential relay, means at each end thereof for increasing the battery potential connected thereto for operating both the distant differential and additional relay, means for completely shunting said additional relay at the outgoing end of said signal circuit, and means responsive to the operation of the differential relay at the incoming end of said signal circuit for completely shunting said additional relay.

3. The combination of a two wire communication channel and a derived signal circuit therefor, said signal circuit consisting of a differential duplex circuit including at each end thereof a differential relay and having means at one end to reverse the polarity of a battery supply to operate the said differential relay at the distant end, the relays of said differential duplex circuit being also responsive to the application of an increased potential, a source of increased potential at each end of said circuit and means for applying said source to said circuit to operate relays at the distant end thereof, an additional relay in said circuit at each end thereof each responsive to the application of said increased potential at the distant end of said circuit, means responsive to the seizure of one end of said circuit for short circuiting the said additional relay at said one end and means responsive to the first operation of a said differential duplex relay at the other end thereof for short circuiting said additional relay thereat.

4. The combination of a two wire communication channel and a derived signal circuit therefor, said signal circuit consisting of a differential duplex circuit including at each end thereof a differential relay and having means at one end to reverse the polarity of a battery supply to operate the said differential relay at the distant end, the relays of said differential duplex circuit being also responsive to the application of an increased potential, a source of increased potential at each end of said circuit and means for applying said source to said circuit to operate relays at the distant end thereof, an additional relay in said circuit at each end thereof each responsive to the application of said increased potential at the distant end of said circuit, means responsive to the seizure of one end of said circuit for shortcircuiting the said additional relay at said one end and means responsive to the first operation of a said differential duplex relay at the other end thereof for shortcircuiting said additional relay thereat, said additional relay having a locking winding whereby its transient operation may be converted into a permanent operation.

5. The combination of a two wire communication channel and a derived signal circuit therefor, said signal circuit consisting of a differential duplex circuit including at each end thereof a differential relay and having means at one end to reverse the polarity of a battery supply to operate the said differential relay at the distant end, the relays of said differential duplex circuit being also responsive to the application of an increased potential, a source of increased potential at each end of said circuit and means for applying said source to said circuit to operate relays at the distant end thereof, an additional relay in said circuit at each end thereof each responsive to the application of said increased potential at the distant end of said circuit, means responsive to the seizure of one end of said circuit for shortcircuiting the said additional relay at said one end, means responsive to the first operation of a said differential duplex relay at the other end thereof for short circuiting said additional relay thereat, a locking winding for each said additional relay and a rectifier in shunt of each said additional relay to render it unresponsive to a distant battery potential reversal.

6. A two way trunk circuit having terminal circuits interconnected by a two wire communication channel and a derived signal circuit, each said terminal circuit having a plurality of outgoing terminals and incoming circuit arrangement, said signal circuit consisting of a differential duplex circuit including at each end thereof a differential relay and having means at one end to reverse the polarity of a battery supply to operate the said differential relay at the distant end, the relays of said differential duplex circuit being also responsive to the application of an increased potential, a source of increased potential at each end of said circuit and means for applying said source to said circuit to operate relays at the distant end thereof, an additional relay in said circuit at each end thereof each responsive to the application of said increased potential at the distant end of said circuit, means responsive to the seizure of one end of said circuit for shortcircuiting the said additional relay at said one end and means responsive to the first operation of a differential duplex relay at the other end thereof for short circuiting said additional relay thereat, said means for applying said source of increased potential to said circuit being selectively responsive to the seizure of said terminal circuit over a given one of said outgoing terminals.

7. The combination of a two way trunk circuit including a long line link consisting of a two wire communication channel and a derived signal circuit, consisting of a differential duplex arrangement including a differential relay in said derived signal circuit at each end thereof, polar duplex relays in said derived signal circuit at each end thereof and means at one end of said trunk responsive to the seizure thereof for excluding the said polar duplex relay thereat and means responsive to an operation of said differential duplex arrangement for excluding said polar duplex relay at the distant end of said trunk, said trunk circuit having a plurality of outgoing terminals at each end thereof and means selectively responsive to the seizure of said trunk over one or another of said outgoing terminals for transiently operating said polar duplex relay at the distant end thereof.

8. The combination of a two way trunk circuit having a long line link consisting of a two wire communication channel and a derived signal circuit, a terminal circuit for one end of said link having a plurality of different sets of outgoing terminals, means in said terminal circuit responsive to the seizure thereof over one of said sets of outgoing terminals for transmitting a discriminating signal over said derived signal circuit, means in said terminal circuit responsive to the receipt of a discriminating signal, a set of incoming terminals for said terminal circuit, switching means connected thereto, enabling means for said switching means responsive to said incoming discriminating signal responsive means, means in said switching means for transmitting supervisory signals, and means in said terminal circuit responsive to a supervisory signal transmitted from said switching means for transmitting a signal over said derived signal circuit.

9. The combination of a two way trunk circuit having a long line link consisting of a two wire communication channel and a derived signal circuit, a terminal circuit for one end of said link having a plurality of different sets of outgoing terminals, means in said terminal circuit responsive to the seizure thereof over one of said sets of outgoing terminals for transmitting an increased potential discriminating signal over said derived signal circuit, means in said terminal circuit responsive to the receipt of an increased potential discriminating signal, a set of incoming terminals for said terminal circuit, switching means connected thereto, enabling means for said switching means responsive to said incoming discriminating signal responsive means, means in said switching means for transmitting supervisory signals, and means in said terminal circuit responsive to a supervisory signal transmitted from said switching means for transmitting a reversed potential signal over said derived signal circuit.

10. The combination of a two way trunk circuit having a long line link consisting of a two wire communication channel and a derived signal circuit, a terminal circuit for one end of said link having a plurality of different sets of outgoing terminals, means in said terminal circuit selectively responsive to the seizure of said circuit over said outgoing terminals for transmitting a discriminating signal over said derived signal circuit, a set of incoming terminals for said terminal circuit and a switch connected thereto, a pulse correction circuit responsive to trains of pulses incoming over said derived signal circuit for operating said incoming switch, said incoming terminals and said incoming switch having a pair of communication conductors and an extra control conductor, said switch having means for extending said conductors over a switch train, means for transmitting signals consisting of inversion of said communication conductors and the reversal of potential on said control conductor over said switch train, and means in said terminal circuit responsive to inversion of said communication conductors and a reversal of potential on said control conductor beyond said incoming switch for transmitting a satisfaction signal over said derived signal circuit.

11. The combination of a two way trunk circuit having a long line link consisting of a two wire communication channel and a derived signal circuit, a terminal circuit for one end of said link having a plurality of different sets of outgoing terminals, means in said terminal circuit selectively responsive to the seizure of said circuit over said outgoing terminals for transmitting a discriminating signal over said derived signal circuit, a set of incoming terminals for said terminal circuit and a switch connected thereto, a pulse correction circuit responsive to trains of pulses incoming over said derived signal circuit for operating said incoming switch and responsive to trains of pulses received over one of said outgoing terminals for transmission over said derived signal circuit, said incoming terminals and said incoming switch having a pair of communication conductors and an extra control conductor, said switch having means for extending said conductors over a switch train, means for transmitting signals consisting of inversion of said communication conductors and the reversal of potential on said control conductor over said switch train, and means in said terminal circuit responsive to inversion of said communication conductors and a reversal of potential on said control conductor beyond said incoming switch for transmitting a satisfaction signal over said derived signal circuit.

12. The combination of a two wire communication channel and a derived signal circuit therefor, a two way trunk circuit terminal arrangement for each end of said communication channel, said terminal circuit arrangement having a plurality of sets of terminals through which outgoing calls to the distant end of said channel may be established and a plurality of sets of incoming terminals through which incoming calls from the distant end of said channel may be extended, said derived signal circuit having at each end thereof means responsive to the seizure of said terminal circuit over one of said sets of outgoing terminals for reversing the polarity of battery potential normally applied thereto and responsive to the seizure of said terminal circuit over another of said sets of outgoing terminals for increasing the potential of battery normally applied thereto, a source of battery having one pole normally applied to said derived circuit at each end thereof, means at each end thereof for reversing the polarity of said battery, a source of increased battery potential and means at each end of said derived circuit for applying said increased potential thereto, a differential relay and a polar relay at each end of said derived circuit each having a winding serially included in said derived circuit, the distant differential relay being responsive to a reversal of said battery potential at the said outgoing end of said trunk and both the distant polar and differential relays being responsive to an increase of battery potential at said outgoing end of said trunk and selecting means responsive in one case to the operation of a said differential relay alone and in another case to the operation of both a said polar and a said differential relay for selectively enabling a different one of said sets of incoming terminals thereat.

References Cited in the file of this patent

UNITED STATES PATENTS

| | | |
|---|---|---|
| 2,162,892 | Koechling | June 20, 1939 |
| 2,248,935 | Baughman | July 15, 1941 |
| 2,376,275 | Rhoads | May 15, 1945 |
| 2,500,286 | Jones | Mar. 14, 1950 |
| 2,621,258 | Balzer | Dec. 9, 1952 |
| 2,629,018 | Wicks | Feb. 17, 1953 |